PREPAYMENT DEVICE
Filed Feb. 23, 1967
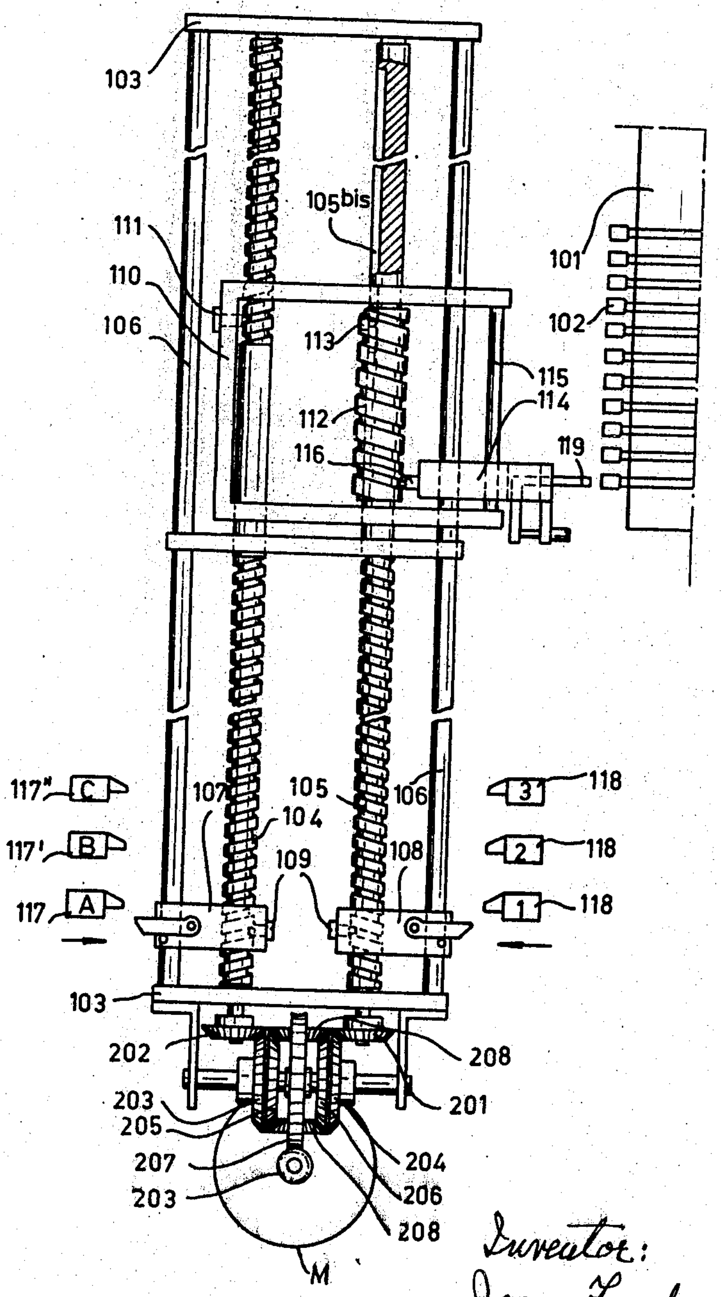
Inventor:
Jean Foufounis
By Robert E. Burns
Atty.

United States Patent Office 3,493,233
Patented Feb. 3, 1970

3,493,233

PREPAYMENT DEVICE

Jean Foufounis, 27b Chemin du Chene 1020, Lausanne-Renens, Switzerland

Filed Feb. 23, 1967, Ser. No. 618,108
Claims priority, application Switzerland, Feb. 28, 1966, 2,862/66
Int. Cl. G11b *17/22*
U.S. Cl. 274—10 6 Claims

ABSTRACT OF THE DISCLOSURE

Selecting device permitting to obtain by the action of two rows of push buttons in a pre-payment distributing apparatus, a number of selections equal to the number of combinations possible between all the buttons of each row and characterised by the fact that two independent markers can move along a row of selection buttons and by each of these movements cause in a given proportion, the movement of a third marker bearing an element to register the selected selection in the distribution apparatus.

There exists a number of control devices for apparatus distributing merchandise automatically after introduction therein of a token or a coin.

Some of these apparatus must have a reduced dimension and offer a wide variety of products.

Such is the case for example of juke boxes which permit the user, after introduction of a coin, to choose one record among the 100 or 200 selections possible.

In such cases, it is impossible to align side by side a number of selection buttons corresponding to the choice offered: in such cases there are used two series of buttons, one bearing letters and the other bearing numbers and the combination of the two buttons permits making the choice desired.

Thus for example ten buttons bearing the letters A to J together with ten buttons bearing the numbers 1 to 0 permit one hundred different combinations while the selection keyboard remains small, the buttons being sufficiently separated to be easily operated.

All of these so called combination-making devices are generally based on electronic operating principles with various relays and electro-magnets which render them simultaneously complex, delicate and expensive.

The present invention has for its object a combination-making device based on an entirely mechanical principle and which is so simple that its functioning is not subject to risk.

In the single figure of the drawing there is shown, as an example of an embodiment of the invention, the base of a distributing apparatus 101 (such as for example a juke-box), with a series of selection push-buttons 102 permitting a choice of the merchandise to be dispensed.

It is evident that if these push-buttons were within the reach of the user, the same could push in any number which must be prevented in the case of a prepayment dispenser.

It should be noted that even if the locking device prevented the pushing of two push-buttons at the same time, the problem would still not be solved since in the restricted space available, these push-buttons must be very close to one another when they are present in a large number.

The selector properly so called forming the object of the present invention comprises two lateral flanges 103 in which shafts 104 and 105 can turn.

Shaft 104 is threaded at its two extremities.

Shaft 105, on the contrary, is threaded along its left hand half while the other half carries a groove 105 bis.

The selector comprises also a pair of rods 106 parallel to the two shafts 104 and 105 on which are slidingly mounted two sliders 107 and 108 which permit blocking a respective shaft by engaging the threads of the screws of each shaft.

A sliding support 110 is mounted along screws 104 and 105 which pass therethrough and a screw 111 engages in the thread of shaft 104.

A threaded sleeve 112 extends between the side faces of slider 110 and moves freely along shaft 105 on its right side part which has a groove 105 bis.

This sleeve 112 carries a pen 113 engaged in groove 105 bis of the shaft to make it rotate with shaft 105.

Slider 114 can in turn move inside the support 110 along a fixed rod 115 and along rod 106.

A point 116 integral with slider 114 penetrates in the threads of the threaded sleeve 112 in such a way that slider 114 moves inside slider 110 when a rotational movement is given to the sleeve 112.

The functioning of the above described device will be described below.

Supposing that the elements are in position 0 such as shown on the drawing, it will be noted first that by giving a rotational movement to the threaded shaft 104, the sliders 107 and 110 move together from right to left.

During this time threaded sleeve 112 is guided by groove 105 bis of shaft 105 and will not turn.

Consequently, slider 114 will follow the same movement as slider 110. On the contrary, after stopping shaft 104, if there is imparted a rotational movement to the shaft 105, slider 110 will remain stationary while sleeve 112 will be given a rotational movement which will have the effect of causing the relative movement of slider 114 with respect to slider 110.

Let us suppose that selection push-buttons 117, 117' are positioned in such a way as to become interposed, when they are pushed in along the path followed by slider 107 in the direction of the arrow, in order to block the latter perpendicular to the second push button and that a second series of buttons 118, 118' etc. acts in the same way to stop in its passage slider 108.

Suppose furthermore for the sake of the description that there are ten buttons 117 bearing letters A, B, C etc. up to J and ten buttons 118 having numbers 1, 2, 3 etc. up to 0.

On slider 114 is secured a pushing system 119 (an electro-magnet for example), for actuating the selecting means for the dispensing apparatus 101 comprising one hundred push-button 102, positioned for example by 4 mm. one from the other.

Screw 104 has on its left hand side a thread having a pitch of 20 mm. corresponding to the spacing of buttons A, B, C etc. and on its right hand side a thread having a pitch of 40 mm., corresponding to the spacing of ten push-buttons 102 and screw 105 has on its left hand side a thread of the same pitch of 20 mm. which corresponds to the spacing of buttons A, B, C etc., while threaded sleeve 112 has a pitch of 40 mm.

It is then evident that if any one of the push-buttons bearing the letter is pushed, screw 104 can be turned but will be blocked in front of the button pushed in which case slider 110 will have gone over as many times the path separating the ten selection push-buttons 102 as there will be buttons 117 between the starting point and the button which is pushed.

From this locking position, if there is pushed any one of the buttons 118 carrying numbers 1, 2, 3 etc. screw 105 will drive slider 108 until it becomes blocked against the button pushed, while slider 114 will run over as many times the space separating the two consecutive push buttons as there are buttons between point 0 and the button pushed.

It is clear that this purely mechanical arrangement permits one hundred different combinations and that the action of electro-magnet 119 if it is provoked at the moment when the two sliders 107 and 108 stop will cause the depression of a single selecting button 102 which will correspond exactly to the combination chosen by the user.

It remains to be seen how the same motor can simultaneously actuate the threaded shafts 104 and 105. The end of these shafts carries respectively conical pinions 201 and 202 meshing with two pinions 203 and 204 placed back to back with the two planetary wheels of a differential 205, 206.

A toothed crown 207 carries pinions 208 integral with the differential and meshing with both pinions 205 and 206.

This arrangement permits a motor M to drive simultaneously, by the intermediary of a screw 203, the shafts 104 and 105, and the effect of the differential will permit this driving to take place until the two sliders 107 and 108 come to bear against the respective selection buttons, one from the letters series and the other from the numbers series.

Consequently it is only when the two sliders 107 and 108 will each have been stopped by the respective buttons placed on their path that the motor will be stopped while the assembly then is positioned correctly for the desired selection.

Naturally the preceding description is given by way of example and is not limiting. Thus for example the screws driving the sliders could be easily replaced by small chains or by ratchets controlled by pinions and running at suitable speeds and slider 110 carrying slider 114 could be replaced by a single slider driven not by the pinions of the differential but by the motor shaft.

What is claimed is:

1. In a prepayment dispensing apparatus, a mechanical selecting device comprising two rows of push buttons designated respectively by numbers and letters, said push buttons being operable for forming combinations of numbers and letters, each combination representing a selection desired, first and second independent sliders mounted for movement respectively along said rows, first and second drive means for moving said sliders respectively along the respective said row of push buttons, said push buttons selectively limiting movement of said sliders according to what combination of push buttons is operated, differential means connecting said drive means to provide differential movement of said sliders, a third slider movable by said drive means by an amount in response to the combined movement of said independent sliders, and means carried by said third slider for making the desired selection of said dispensing apparatus.

2. Apparatus according to claim 1, wherein said differential means comprises two planetary pinions, each of said pinions driving said drive means for one of said independent sliders respectively.

3. Apparatus according to claim 1, wherein means for moving said third slider comprises a movable support, means operable by said first drive means for moving said support proportionally to the movement of said first slider, and third drive means carried by said movable support and operable by said second drive means to move said third slider relative to said support proportionally to the movement of said second slider.

4. Apparatus according to claim 3, wherein said first and second drive means comprise first and second threaded shafts respectively.

5. Apparatus according to claim 4, wherein said second threaded shaft also includes an unthreaded portion, and said third drive means comprises a threaded sleeve slidable with said movable support along said unthreaded portion of said second shaft and rotatable with said second shaft.

6. Apparatus according to claim 1, wherein said dispensing apparatus has a series of push buttons for making selections and said means carried by said third slider comprises means for actuating a selected said push button according to the position of said third slider.

References Cited

UNITED STATES PATENTS

| | | | |
|---|---|---|---|
| 3,056,874 | 10/1962 | Gough | 200—158 |
| 3,050,309 | 8/1962 | Osborne et al. | 274—10.1 |

FOREIGN PATENTS

| | | |
|---|---|---|
| 748,055 | 4/1956 | Great Britain. |

LEONARD FORMAN, Primary Examiner

STEVEN L. STEPHAN, Assistant Examiner

U.S. Cl. X.R.

74—89.15; 200—153, 158; 235—61; 335—69